United States Patent Office 3,432,260
Patented Mar. 11, 1969

3,432,260
PROCESS FOR THE MANUFACTURE OF SODIUM TRIPOLYPHOSPHATE
Winfried Kern, Hurth, near Cologne, and Gero Heymer, Knapsack, near Cologne, Germany, assignors to Knapsack Aktiengesellschaft, Knapsack, near Cologne, Germany, a corporation of Germany
Filed Dec. 29, 1967, Ser. No. 694,626
Claims priority, application Germany, Jan. 2, 1967, K 61,071
U.S. Cl. 23—106    3 Claims
Int. Cl. C01b 25/30

ABSTRACT OF THE DISCLOSURE

Production of water-insoluble sodium tripolyphosphate, so-called Maddrell's salt, by thermal treatment of monobasic sodium phosphate comprising the steps of heating the monobasic sodium phosphate, after a short heating-up period to 150° C., at a constant rate between about 2 and 20 centigrade degrees per minute to a temperature of about 450° C., maintaining the hot material at that temperature for a period of time equal to about ⅓ of the time needed to reach that 450° C. temperature, and continuously removing resulting steam.

---

Figure 1:
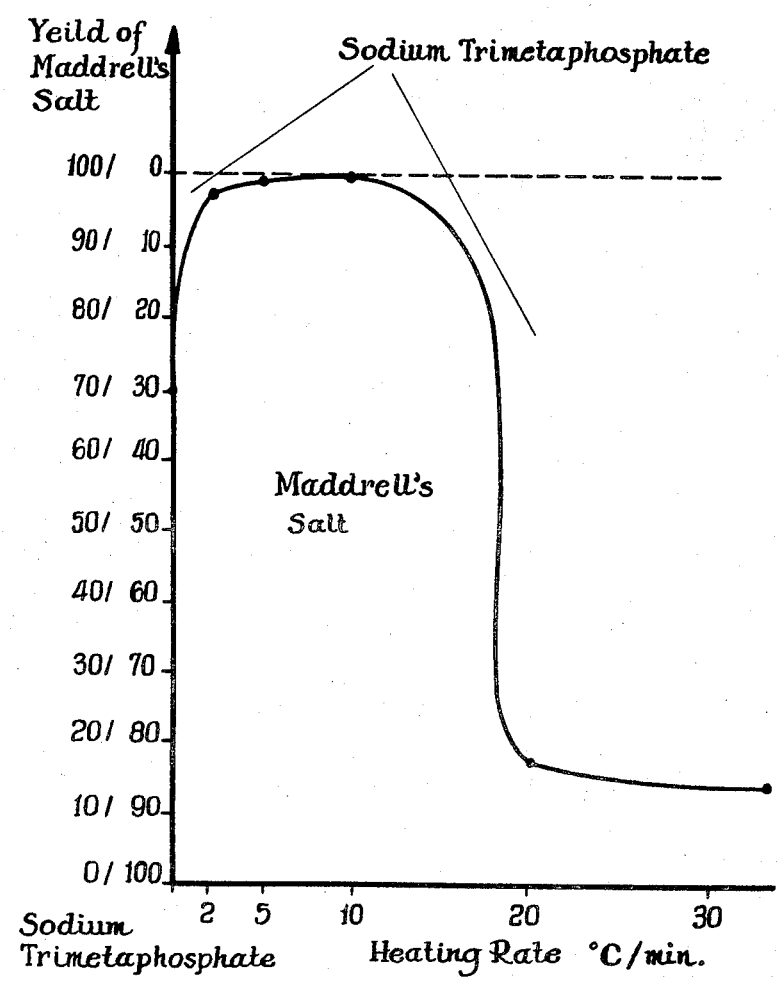

The present invention relates to a process for the manufacture of water-insoluble sodium polyphosphate, so-called Maddrell's salt, by thermal treatment of monobasic sodium phosphate, inside a kiln.

It is known that Maddrell's salt can be produced by dehydration of monobasic sodium phosphate. Depending on the reaction conditions used, the dehydration is found to entail more or less the formation of water-soluble phosphates, such as acid sodium pyrophosphate, sodium trimetaphosphate or long chain soluble polyphosphates.

It is often desirable to produce Maddrell's salt in a form fairly free from water-soluble phosphates, especially when the compound is intended for use as a polishing agent for tooth pastes. More particularly, it is desirable to obtain products containing less than 1% by weight soluble phosphates, which are known to have strong complex-forming properties and, therefore, a deleterious effect upon tooth enamel.

A process for making Maddrell's salt has been disclosed in U.S. Patent 2,356,799, wherein $NaH_2PO_4$ moistened with up to 5% by weight water is compressed into pellets which are subsequently heated in a stream of hot air to a temperature between 300 and 460° C., inside a rotary kiln.

The resulting products are formed of only about 95% of $NaPO_3$ (cf. Journal of America Chemical Society 81 (1959), page 79) and contain varying proportions of soluble phosphates (cf. U.S. Patent 2,356,799, page 2, left hand column, lines 19–23), which are practically always about 1% by weight.

Experiments have further shown that inside a rotary kiln $NaH_2PO_4$ tends to agglomerate or cake together.

Experiments have shown that even by the use of a pelletized $NaH_2PO_4$ it is impossible substantially to obviate this disadvantage.

It has now unexpectedly been found that pure Maddrell's salt containing less than 1% soluble phosphates can be produced by a simple and continuous process wherein, after a short heating-up period to about 150° C., monobasic sodium phosphate is heated inside a kiln, at a constant rate between about 2 and 20° C./min., preferably between 5 and 10° C./min., to a temperature of about 450° C., maintained then at that temperature for a period of time equal to about ⅓ of the time needed to reach that 450° C. temperature, and resulting steam is continuously removed from the kiln.

Needless to say the skilled artisan could not expect the dehydration of monobasic sodium phosphate into metaphosphates to produce different final products, as a function of the heating rate selected, nor could he expect a particular heating rate to produce practically pure Maddrell's salt containing less than 1% soluble matter. The thermal treatment should be carried out at a final temperature of 450° C. The reason is that higher temperatures entail transformation of Maddrell's salt into sodium trimetaphosphate.

The monobasic sodium phosphate is preferably heated by conveying it at a constant rate through a kiln arranged to establish a suitable temperature curve therein.

In U.S. Patent 2,356,799, it has been suggested that $NaH_2PO_4$ be heated up to a temperature of 460° C. within a period of 1 to 4 hours, averaging a heating rate of 1.0 to 7.6 centigrade degrees per minute. However, this is no controlled heating inside a rotary kiln nor is the heating carried out uniformly at a constant rate.

The test results obtained are indicated in the accompanying drawing, FIGURE 1. Small amounts of 0.5 gram $NaH_2PO_4$ placed in a special apparatus were heated to a temperature of 450° C. at quite specific heating rates. The tests were carried out in stationary air. Heating rates between 5 and 10 degrees per minute have been found to produce Maddrell's salt in optimum yields, which decrease when the heating rates are outside the above range. Heating rates of more than 10 degrees per minute have furthermore been found to produce strongly sintered final product, while heating rates of 10 degrees per minute or less always produce readily friable material.

In those cases in which the heating rate had been selected higher than 10 degrees per minute, the substance was post-annealed for 30 minutes at 450° C. for complete dehydration. The resulting final products were then found to be comprised of mixtures of Maddrell's salt with sodium trimetaphosphate.

Figure 2:
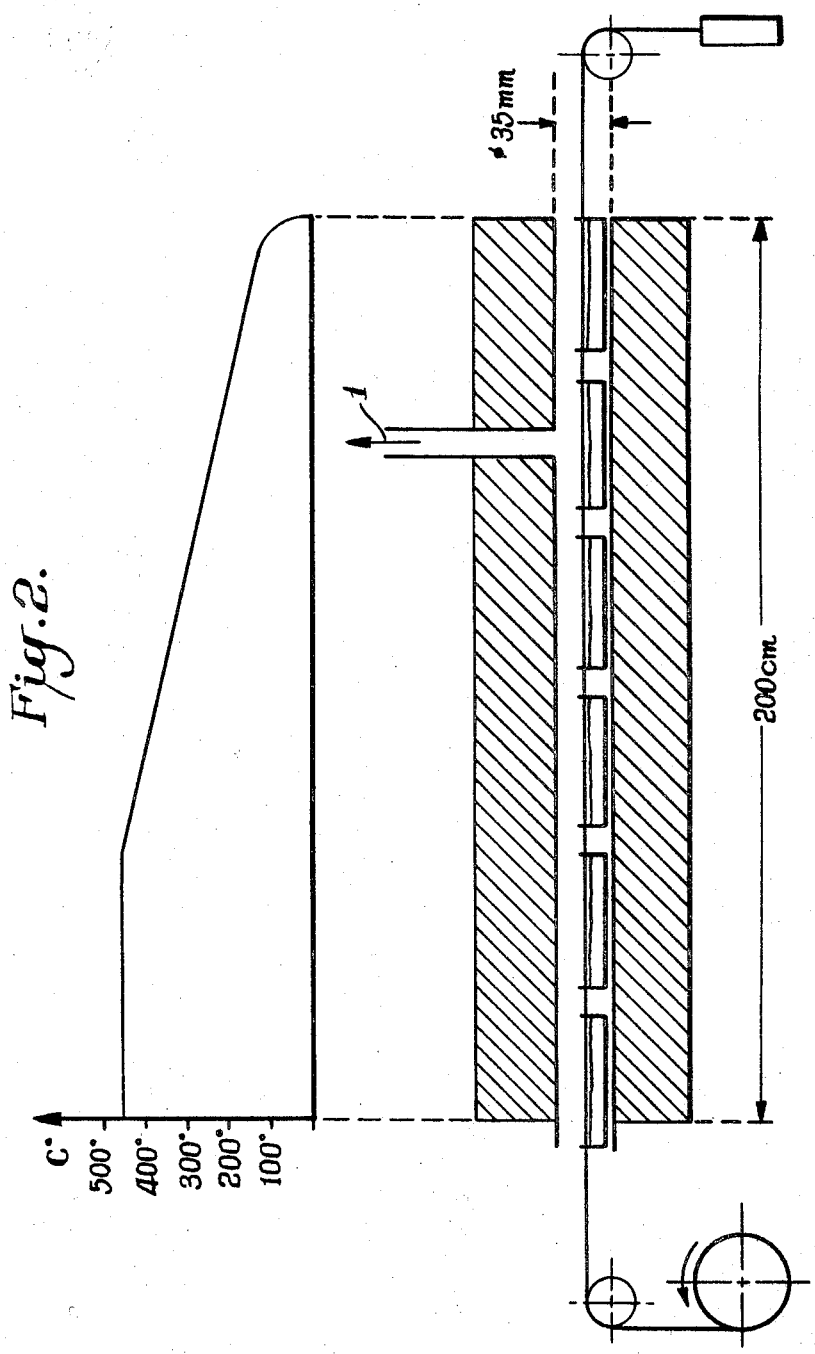

Maddrell's salt should be conveniently produced in an apparatus such as shown diagrammatically in the accompanying drawing, FIGURE 2.

A kiln 2 meters long was provided with filament windings (not shown in the drawing) so as to establish therein a temperature curve such as shown in the drawing, and small boats filled with $NaH_2PO_4$ were slowly passed through the kiln so as to increase the temperature at a rate of 5 to 10 degrees per minute. Resulting steam (1) was exhausted from the reaction tube. Failing this, the material will be found strongly to sinter together and predominantly to form sodium trimetaphosphate. On the other hand, when steam was exhausted, there was obtained a final product which was comprised of practically pure Maddrell's salt and contained no more than 0.5 to 1% by weight soluble phosphates.

Example 1

50 grams $NaH_2PO_4$ placed in a small stainless sheet metal boat were conveyed through the kiln, at a constant rate of 4.6 cm./minute. The kiln had an overall length of 2 meters. The boat was thus allowed to remain therein for a period of 43 minute. The temperature increase produced on passing the boat through the kiln was equal to 10.6 degrees per minute.

In this example using only one boat, it was unnecessary to exhaust steam.

The final product (42 grams) was formed of 99.1% Maddrell's salt and obtained in the form of a soft cake readily friable by hand. The product contained 0.9% soluble matter.

The following Example 2 shows how matters change on heating the $NaH_2PO_4$ feed material at varying heating rates.

Example 2

50 grams $NaH_2PO_4$ placed in a small stainless sheet metal boat were first conveyed through the kiln at a rate of 15 cm./min. Temperature increase=35 degrees per minute.

After the 450° C. temperature had been reached, the boat was maintained at that temperature for a further 33 minutes. In other words, the boat was allowed to remain in the kiln for a total period of 43 minutes, as in Example 1.

No steam was exhausted.

The final product (42 grams) was formed of only 12% Maddrell's salt and of 88% soluble matter. It was furthermore found to be very hard and very difficult to comminute.

Very slow heating on the other hand was also found to produce final product with a considerable proportion of soluble $P_2O_5$.

Example 3

50 grams $NaH_2PO_4$ placed in a small stainess sheet metal boat were conveyed through the kiln, at a constant rate of 0.3 cm./min. The temperature increase was not higher than 0.7 degree per minute. In this case it was also unnecessary to exhaust steam.

The final product (42 grams) was formed of 64% Maddrell's salt and of 36% water-soluble phosphates.

Example 4

500 grams $NaH_2PO_4$ were placed in ten small stainless sheet metal boats and conveyed one after the other through the kiln, at a rate of 4.6 cm./min., corresponding to a temperature increase of 10.6 degrees per minute. 600 liters air per hour were simultaneously passed through the apparatus for removal of steam. The resulting final product (425 grams) was formed of 99.4% by weight Maddrell's salt and obtained in the form of a very readily friable cake, which could be removed from the boats without difficulty. The proportion of soluble matter was found to be 0.6% by weight.

Example 5

650 grams $NaH_2PO_4$ were placed in thirteen small boats, which were conveyed through the kiln at a rate of 2.8 cm./min., corresponding to a temperature increase of 6.5 degrees per minute. 300 liters air per hours were used for removal of steam. The final product (550 grams) was formed of 99.2% by weight Maddrell's salt and 0.8% by weight soluble phosphates.

We claim:
1. A process for manufacturing a Maddrell salt having less than 1% soluble phosphates in a continuous manner from monobasic sodium phosphate, which comprises initially heating monobasic sodium phosphate reactant to about 150° C. and thereafter raising the temperature at a constant rate of about 2–20° C. per minute to a final temperature of about 450° C.; maintaining the reactant material at that temperature for a period equal to about ⅓ of the time needed to raise the reactant from 150° C. to 450° C.; continuously removing steam therefrom during said heating.

2. The process of claim 1 wherein the monobasic sodium phosphate reactant is moved at constant rate through a heating zone.

3. The process of claim 1 wherein the monobasic sodium phosphate reactant is heated from 150–450° C. at a rate between about 5–10° C. per minute.

References Cited

UNITED STATES PATENTS 2,356,799    8/1944    Taylor et al. _____ 23—106

OSCAR R. VERTIZ, *Primary Examiner.*

L. A. MARSH, *Assistant Examiner.*